US011186306B2

(12) United States Patent
Fan et al.

(10) Patent No.: US 11,186,306 B2
(45) Date of Patent: Nov. 30, 2021

(54) HANDLE FOLDING MECHANISM, THREE-FOLD HANDLE EMPLOYING THE FOLDING MECHANISM, AND STROLLER HAVING THE SAME

(71) Applicant: DOREL JUVENILE (ZHONGSHAN) PRODUCT CO., LTD, Guangdong (CN)

(72) Inventors: Mingfeng Fan, Shenzhen (CN); Dequan Zhang, Zhongshan (CN); Shoubin Hu, Guangdong (CN)

(73) Assignee: DOREL JUVENILE (ZHONGSHAN) PRODUCT CO., LTD, Guangdong (CN)

( * ) Notice: Subject to any disclaimer, the term of this patent is extended or adjusted under 35 U.S.C. 154(b) by 0 days.

(21) Appl. No.: 17/042,961

(22) PCT Filed: Jul. 16, 2018

(86) PCT No.: PCT/CN2018/095751
§ 371 (c)(1),
(2) Date: Sep. 29, 2020

(87) PCT Pub. No.: WO2020/014810
PCT Pub. Date: Jan. 23, 2020

(65) Prior Publication Data
US 2021/0053606 A1      Feb. 25, 2021

(51) Int. Cl.
*B62B 9/20* (2006.01)
*B62B 7/04* (2006.01)
(52) U.S. Cl.
CPC . *B62B 9/20* (2013.01); *B62B 7/04* (2013.01)

(58) Field of Classification Search
CPC .... B62B 9/20; B62B 9/12; B62B 7/04; B62B 7/042; B62B 7/06; B62B 7/08; B62B 7/086; B62B 7/062; B62B 7/064; B62B 7/066
See application file for complete search history.

(56) References Cited

U.S. PATENT DOCUMENTS

| 4,272,100 A * | 6/1981 | Kassai | B62B 7/08 |
| | | | 280/47.4 |
| 6,322,098 B1 * | 11/2001 | Lan | B62B 7/08 |
| | | | 280/42 |

(Continued)

FOREIGN PATENT DOCUMENTS

| CN | 1291569 | 4/2001 |
| CN | 1405046 | 3/2003 |

(Continued)

OTHER PUBLICATIONS

"International Search Report (Form PCT/ISA/210) of PCT/CN2018/095751", dated Dec. 10, 2018, with English translation thereof, pp. 1-4.

*Primary Examiner* — John D Walters
(74) *Attorney, Agent, or Firm* — JCIPRNET

(57) ABSTRACT

A handle folding mechanism, a three-fold handle employing the folding mechanism, and a stroller having the same are provided. The folding mechanism includes an intermediate component and a pair of connecting components. The intermediate component includes a tubular casing, a press block, and an unlocking piece. A rear part of the press block passes through a front surface of the casing to extend into the casing, and is movable back and forth. The connecting component includes a tubular housing and an engaging piece. The engaging piece is slidably mounted in the housing. In a locked state, a front end of the engaging piece penetrates into the casing. The unlocking piece has a fixing (Continued)

part, and the fixing part is disposed with a free end extending between a rear end of the press block and the front end of the engaging piece.

10 Claims, 8 Drawing Sheets

(56) References Cited

U.S. PATENT DOCUMENTS

| | | | |
|---|---|---|---|
| 6,485,216 B1 | 11/2002 | Cheng | |
| 7,114,743 B2 * | 10/2006 | Kassai | B62B 7/08 280/650 |
| 8,408,580 B2 * | 4/2013 | Liao | B62B 7/062 280/642 |
| 10,377,406 B2 * | 8/2019 | Baek | B62B 9/104 |
| 2009/0121454 A1 * | 5/2009 | Tomasi | B62B 7/08 280/642 |

FOREIGN PATENT DOCUMENTS

| | | |
|---|---|---|
| CN | 107757693 | 3/2018 |
| CN | 108016481 | 5/2018 |
| JP | 2005238996 | 9/2005 |

* cited by examiner

HANDLE FOLDING MECHANISM, THREE-FOLD HANDLE EMPLOYING THE FOLDING MECHANISM, AND STROLLER HAVING THE SAME

CROSS-REFERENCE TO RELATED APPLICATION

This application is a 371 application of International PCT application serial no. PCT/CN2018/095751, filed on Jul. 16, 2018. The entirety of the abovementioned patent application is hereby incorporated by reference herein and made a part of this specification.

BACKGROUND

Technical Field

The disclosure relates to a lightweight stroller, and in particular to a handle folding mechanism, a three-fold handle employing the folding mechanism, and a stroller having the three-fold handle.

Description of Related Art

When using lightweight strollers in daily life, in order to facilitate portability and storage to achieve the objective of saving storage space, lightweight strollers of various applications generally adopt the method of folding in a lateral direction (that is, width) to reduce the volume. When some strollers are folded, the handles of the strollers need to be folded together with the body. Such housing often occurs on the handles across the stroller frames. At present, such handles may be implemented as two-fold or three-fold through the lateral folding mechanism according to actual requirements to reduce the volume to the largest extent.

However, the existing lateral folding mechanism of the handles mostly adopt gear pairs, which results in large number of components of the lateral folding mechanism, complicated structure, and longer time required for assembly.

SUMMARY

The first objective of the disclosure is to provide a handle folding mechanism with simple structure, low cost, convenient assembly and use, structural stability, and high safety.

The second objective of the disclosure is to provide a three-fold handle employing the handle folding mechanism.

The third objective of the disclosure is to provide a stroller having the three-fold handle.

The first objective of the disclosure is implemented through the following technical measures. A handle folding mechanism includes an intermediate component and a pair of connecting components respectively hinged at two ends of the intermediate component. The intermediate component is mainly composed of a tubular casing, a press block, and an unlocking piece. A rear part of the press block extends into the casing through a front wall surface of the casing and is movably mounted to the casing so that the press block moves back and forth. The connecting component is mainly composed of a tubular housing and an engaging piece having an elasticity restoring component. The engaging piece is slidably mounted in the housing in an axial direction. In a locked state, the front end of the engaging piece laterally penetrates into an end part of the casing. The unlocking piece has a fixing part fixed in the casing. The fixing part is disposed with a free end extending between a rear end of the press block and a front end of the engaging piece to push the press block backward. The free end of the unlocking piece is pushed by the press block so that the unlocking piece is elastically deformed. A projection of the unlocking piece on a horizontal plane is gradually increased so that the engaging piece is pushed out of the casing in a lateral direction to realize unlocking. Before and after releasing an external force, the engaging piece and the press block are respectively restored to original shapes under an action of an elasticity restoring force, and the intermediate component is then pushed forward to fold a handle. Through pulling back the intermediate component, the engaging piece is pushed into the casing to realize locking under the action of the elasticity restoring force when the handle is unfolded to lock again.

The disclosure adopts the unlocking piece to achieve the function of unlocking the handle folding, and enables the press block to automatically return under the action of its own elasticity restoring force. As such, the number of parts is reduced, the composition structure is simple, the cost is low, the linkage coordination relationship between each assembly components is simple, and the assembly is convenient. The operations of unlocking, locking, and folding are simple, safe, and convenient to use, which can minimize the volume of the handle. Also, the overall structure of the disclosure has high stability and safety.

As an improvement of the disclosure, the intermediate component further includes a button having the elasticity restoring component, the button is laterally toggleable and is mounted on a rear wall surface of the casing. A limiting mechanism is provided between the button and the press block, and is co-movable with the button to move the press block or to release a limiting action, the button is toggled to release the limiting action of the limiting mechanism on the press block and simultaneously pushes the press block backward, so as to perform unlocking; or in the locked state, the button is toggled to limit the press block through the limiting mechanism to prevent wrongly operation the press block.

As an embodiment of the disclosure, a front part of a front surface of the engaging piece is an arc surface or an inclined surface, and a rear part thereof is an inclined surface. The arc surface or the inclined surface of the front part are configured to break down the force exerted by the unlocking piece on the engaging piece to form a lateral force component to push the engaging piece out of the casing to unlock. The inclined surface of the rear part is configured to smoothly slide the engaging piece when retracting the stroller to be easily disengaged from the housing of the intermediate component.

As an embodiment of the disclosure, the housing of the connecting component is formed with a sliding groove for mounting the engaging piece, an end of the elasticity restoring component of the engaging piece is fixed to a tail part of the sliding groove, and the other end of the elasticity restoring component is abutted onto a tail end of the engaging piece. A hinge part of the intermediate component and the connecting components has a hinge shaft, and a front part of the engaging piece is disposed with an elongated hole, the hinge shaft is mounted in the elongated hole to hinge an end part of the casing of the intermediate component and the end part of the housing of the connecting components together, and the hinge shaft is co-movable with the engaging piece to relatively slide in the elongated hole.

As an embodiment of the disclosure, the unlocking piece is A-shaped, a middle part of the unlocking piece is a fixing part, the press block is a hollow housing having an opening on a rear end surface thereof, a post extending backward is disposed on an upper rim and/or a lower rim of the opening, the button is mainly composed of a toggle part located outside the casing and a protruding post extending forward in the casing, and the protruding post is movable with the button to abut onto the post to limit the press block or to disengage to release the limiting mechanism; two rims on two opposite sides of the opening in the lateral direction are respectively inclined surfaces, surfaces of two wings of the unlocking piece match the inclined surfaces, during a process of elastic deformation of the unlocking piece, the two wings slide along the inclined surfaces.

As an embodiment of the disclosure, a front end surface of the toggle part of the button is a block body located in the casing of the intermediate component, the protruding post is disposed on the front end surface of the toggle part, and the elasticity restoring component of the button is located between the front end surface of the toggle part and an inner end surface of the casing.

As an embodiment of the disclosure, the casing of the intermediate component is mainly formed by an upper housing and a lower housing joining to each other, an upper surface and a lower surface of a rear part of the press block are respectively disposed with upper and lower corresponding lateral limiting protruding strips, an inner top surface of the upper housing and an inner bottom surface of the lower housing are respectively disposed with lateral limiting slots for restraining the limiting protruding strips, the limiting protruding strips is movable back and forth in the limiting slots to implement movable mounting of the press block.

The second objective of the disclosure is implemented through the following technical measures. A three-fold handle employing the handle folding mechanism includes the intermediate component, the connecting components, and a pair of fixing components. Front ends of the pair of fixing components are respectively hinged with a tail ends of the connecting components, the fixing component is mainly composed of a tube body and a retracting steel rope, the retracting steel rope extends forward through the tube body into a tail end of the housing of the connecting components, so that after unlocking between the intermediate component and the connecting components, the intermediate component is pushed forward, the connecting components drives the retracting steel ropes to rotate around hinge part of the connecting components and the fixing component, so that an effective distance of the retracting steel ropes becomes smaller to drive an engaging structure of a stroller frame to unlock, and that unlocking between the connecting components and the fixing components is realized, and the three-fold of the handle is realized while retracting.

The casing of the intermediate component is mainly formed by an upper housing and a lower housing joining to each other, an upper surface and a lower surface of a rear part of the press block are respectively disposed with upper and lower corresponding lateral limiting protruding strips, an inner top surface of the upper housing and an inner bottom surface of the lower housing are respectively disposed with lateral limiting slots for restraining the limiting protruding strips, the limiting protruding strips is movable back and forth in the limiting slots to implement movable mounting of the press block.

As an embodiment of the disclosure, a lower surface of an end part of the upper housing of the intermediate component is a platform, an upper surface of an end part of the lower housing of the intermediate components is a platform, a gap is formed between the two platforms, a front end of the connecting components is a flattened block body inserted into the gap and fixed by a hinge shaft; the tail end of the connecting components and the front end of the fixing components are respectively curves bending forward, the tail end of the connecting components and the front end of the fixing components respectively have notches matching each other, and the notches respectively have planes attached to each other and are fixed through the hinge shaft, when the intermediate component and the connecting components are locked, the tail end of the connecting components and the front end of the fixing components are in an arc transition, the notches of the connecting component and the fixing components cooperate to form a rotation space for bending between the two after unlocking.

The third objective of the disclosure is implemented through the following technical measures. A stroller having the three-fold handle includes a stroller frame, and a seat and wheels mounted on the stroller frame, the stroller frame comprises a frame body, and the engaging structure for retraction and the tree-fold handle disposed on the frame body, a tail end of the fixing components of the tree-fold handle is connected to the frame body, and a tail end of the retracting steel ropes penetrates into the frame body to be connected to the engaging structure of the stroller frame.

Compared with the prior art, the disclosure has the following obvious effects.

(1) The disclosure adopts the unlocking piece to achieve the function of unlocking the handle folding, and enables the press block to automatically return under the action of its own elasticity restoring force. As such, the number of parts is reduced, the composition structure is simple, the cost is low, the linkage coordination relationship between each assembly components is simple, the assembly is convenient, and the operations of unlocking, locking, and folding are simple, safe, and convenient to use.

(2) When the engaging piece of the disclosure is in the locked state, the front part is completely extended into the tubular housing, which ensures the stability and safety of the handle in the locked state.

(3) The unlocking piece and the engaging piece of the disclosure are separate structures, which retains the respective design space of the unlocking piece and the engaging piece. Under the premise that the length of the engaging piece extending into the tubular housing when in the locked state is consistent with stability and safety, in the housing where the length of the engaging piece extending into the connecting component is lengthened according to specific housings, the overall size of the unlocking piece will not be affected, especially the lateral size of the unlocking piece. Therefore, the lateral size of the handle after folding will not be affected.

(4) The two wings of the unlocking piece adopted in the disclosure are not only the components that directly unlock the engaging piece, but also have the function of elastic deformation to reset, which further simplifies the structure of the entire folding mechanism. In addition, when the two wings of the unlocking piece act on the engaging piece, the deformation happens in the lateral and the front and back directions at the same time, which prevents the unlocking piece from having to set aside a larger movement space in a direction due to a larger deformation in the single direction.

(5) The disclosure limits or releases the limit of the press block by toggling the button, which can prevent the user from wrongly operating the press block causing the stroller to be retracted and affecting safety.

(6) The operation mechanism of unlocking, locking, and folding of the disclosure runs smoothly, and the overall structure is highly stable and safe, which is suitable for wide promotion and application.

BRIEF DESCRIPTION OF THE DRAWINGS

The disclosure will be further described in detail below in conjunction with the drawings and specific embodiments.

DETAILED DESCRIPTION OF DISCLOSED EMBODIMENTS

Figure 1:
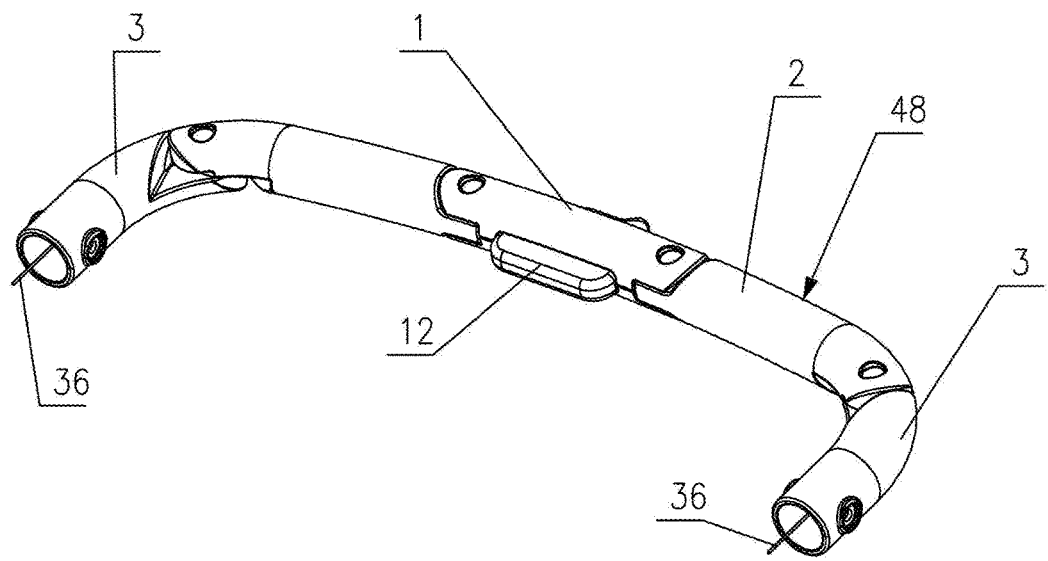
FIG. 1 is a schematic view of a three-dimensional structure of a three-fold handle when in a locked state (unfolded) according to the disclosure.
Figure 2:
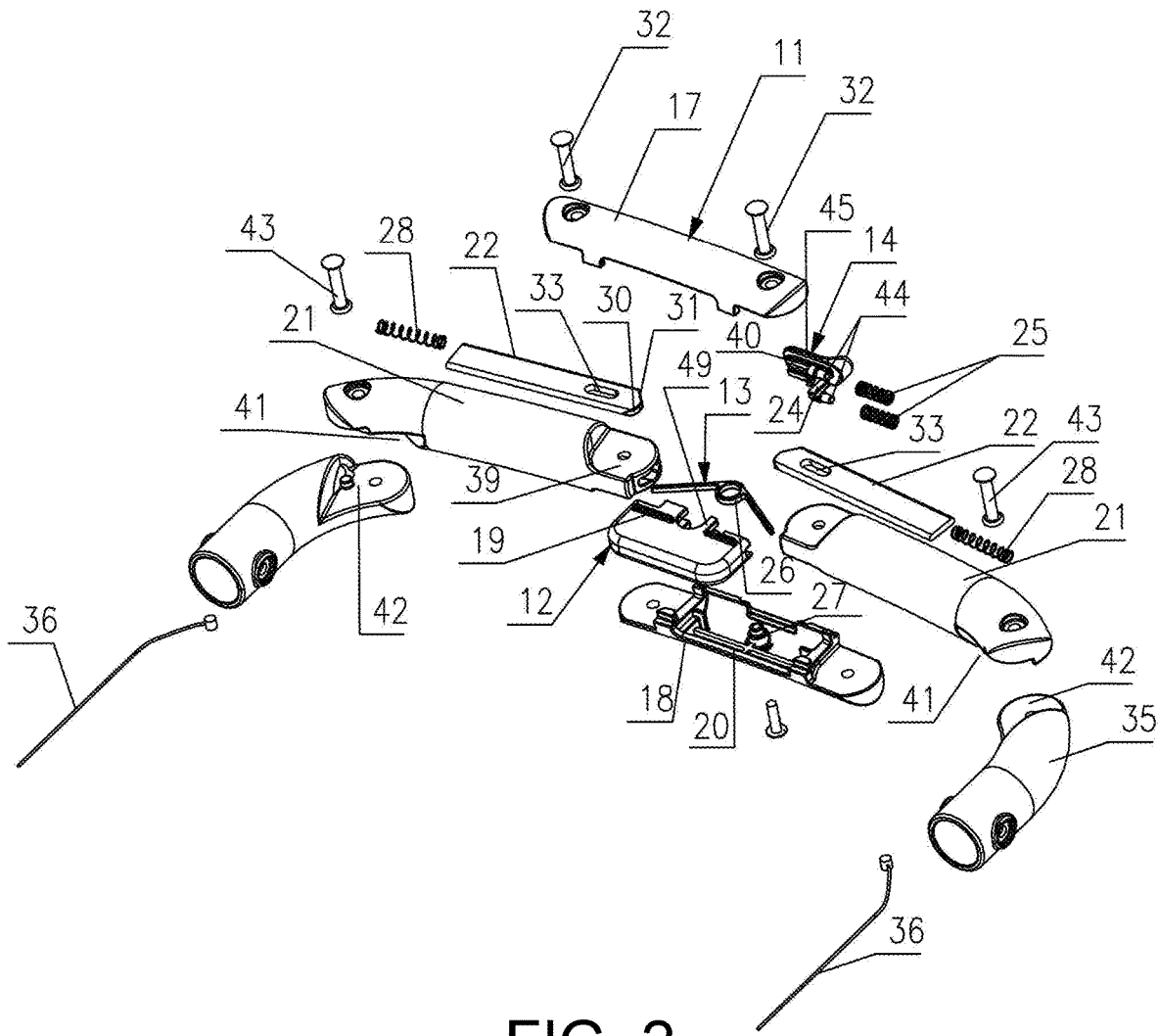
FIG. 2 is a schematic view of an exploded structure of the three-fold handle according to the disclosure.
Figure 3:
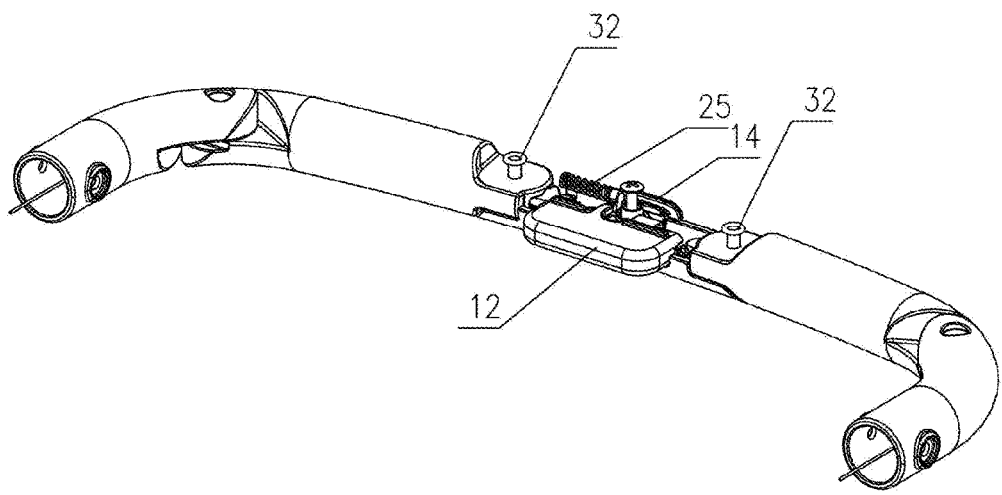
FIG. 3 is a schematic view of a three-dimensional structure of the three-fold handle when in a locked state (unfolded) (with an upper housing of an intermediate component removed) according to the disclosure.
Figure 4:
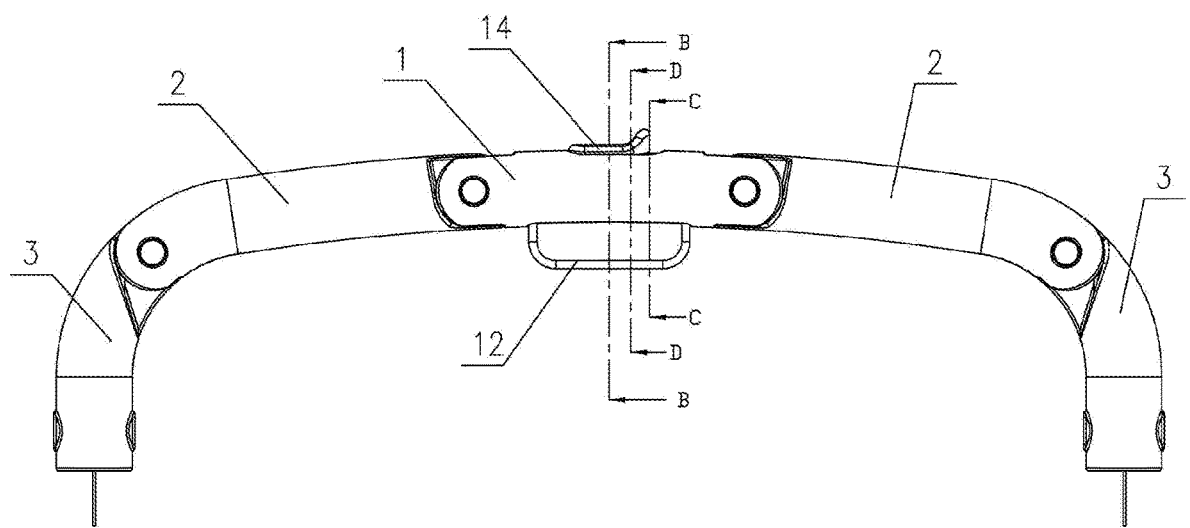
FIG. 4 is a top view of the three-fold handle according to the disclosure.
Figure 5:
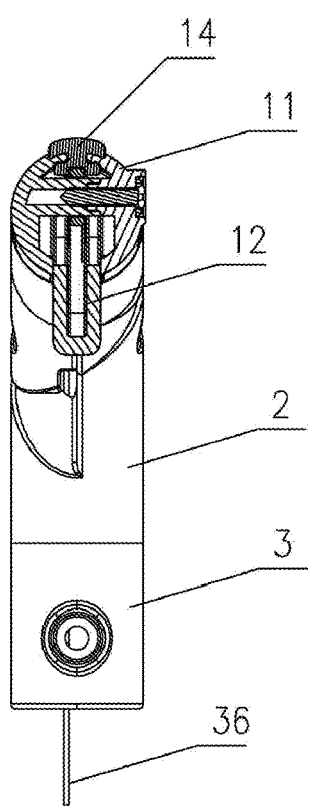
FIG. 5 is a cross-sectional view along line B-B in FIG. 4.
Figure 6:
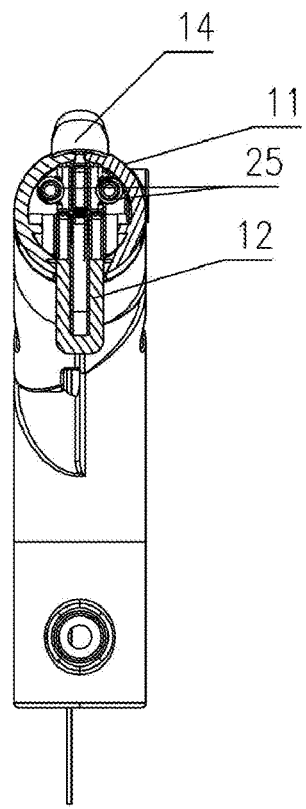
FIG. 6 is a cross-sectional view along line C-C in FIG. 4.
Figure 7:
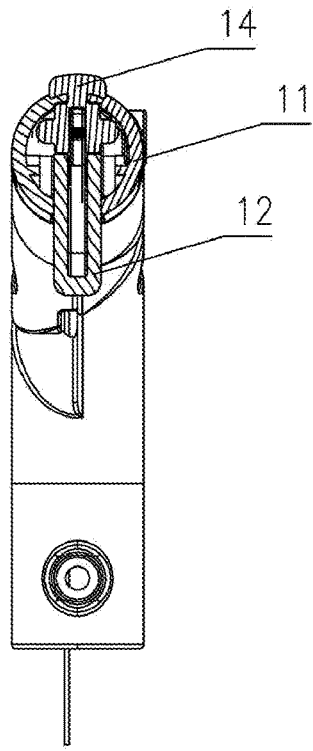
FIG. 7 a cross-sectional view along line D-D in FIG. 4.
Figure 8:
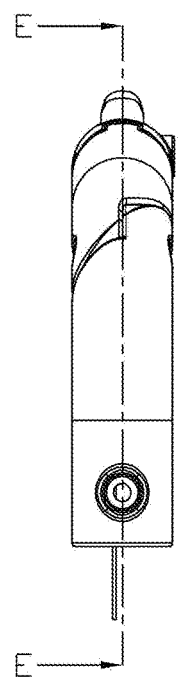
FIG. 8 is a side view of a three-fold handle when in a locked state (unfolded) according to the disclosure.
Figure 9:
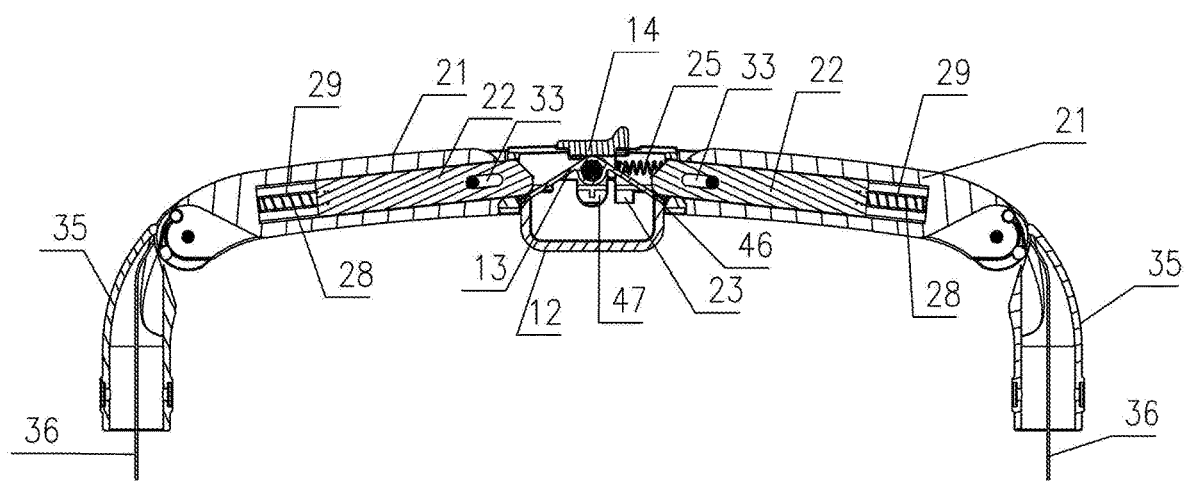
FIG. 9 is a cross-sectional view along line E-E in FIG. 8.

A handle folding mechanism of the disclosure is as shown in FIG. 1 to FIG. 20, which includes an intermediate component 1 and a pair of connecting components 2 respectively hinged at two ends of the intermediate component 1. The intermediate component 1 is mainly composed of a tubular casing 11, a press block 12, a button 14 having an elasticity restoring component, and an unlocking piece 13.

The tubular casing 11 is formed by joining an upper housing 17 and a lower housing 18. A rear part of the press block 12 passes through a front wall surface of the casing 11 to extend thereinto. Specifically, elongated notches are disposed on a lower edge of a front wall surface of the upper housing 17 and an upper edge of a front wall surface of the lower housing 18. A mounting hole for the press block to penetrate is formed after the two notches are joined. Corresponding top and bottom lateral limiting protruding strips 19 are respectively disposed on the upper surface and/or lower surface of the rear part of the press block 12. Lateral limiting slots 20 for restraining the limiting protruding strips are disposed on an inner top surface of the upper housing 17 and an inner bottom surface of the lower housing 18. The limiting protruding strips 19 may move back and forth in the limiting slots 20. The press block 12 is a hollow housing having an opening on a rear end surface. A post 49 extending backward is disposed in the opening corresponding to the upper and lower rims of the upper and lower housings 17 and 18. Grooves 47 and 23 are respectively disposed on two sides of the post 49. The rims on two opposite edges of the opening in the lateral direction are respectively inclined surfaces 46.

The button 14 may be laterally toggled and mounted on a rear wall surface of the casing 11. Specifically, elongated notches are disposed on a lower edge of a rear wall surface of the upper housing 17 and an upper edge of a rear wall surface of the lower housing 18. A mounting hole for mounting a button is formed after the two notches are joined. The button 14 is mainly composed of a toggle part 45 located outside the casing 11 and two protruding posts 24 extending forward and separated from each other in the top and bottom direction in the casing 11. Each protruding post 24 may move with the button 14 to abut onto the corresponding post 49, so as to limit the press block 12, or to disengage from the post, so as to release the press block 12 from being limited. A front end surface 40 of the toggle part of the button 14 is a block body located in the casing. The protruding post 24 is disposed on the front end surface 40 of the toggle part. The elasticity restoring component of the button 14 adopts a pair of springs 25. A side of each protruding post 24 respectively has a lateral sleeving post 44. An end of the pair of springs 25 is respectively sleeved onto the corresponding sleeving post 44, and the other end of the pair of springs 25 is abutted onto an inner end surface of the casing 11.

The unlocking piece 13 is A-shaped, adopts a plastic material, and is located in an interval separated between the two protruding posts, so that the two protruding posts will not affect the unlocking piece when moving with the button. A middle part of the unlocking piece 13 is a fixing part, and has a ring sleeve 26. A fixing post 27 is disposed on the lower housing 18 of the casing. The ring sleeve 26 is sleeved onto the fixing post 27 and is fixed by a fixing member. Two wings of the unlocking piece 13 are two free ends, and surfaces of the two wings respectively match the inclined surfaces 46, so that end parts of the two wings of the unlocking piece 13 are gradually pressed at the inclined surfaces 46 of the press block 12 to implement the unlocking process. The pressure exerted by the inclined surfaces 46 on the end parts of the two wings of the unlocking piece 13 is smaller.

The connecting component 2 is mainly composed of a tubular housing 21 and an engaging piece 22 having an elasticity restoring component. The housing 21 has a sliding groove therein for mounting the engaging piece 22. The engaging piece 22 may slide in an axial direction in the sliding groove. A sliding groove with a larger depth may also prevent the plastic from shrinking due to uneven glue thickness. A front part of the front end surface of the engaging piece 22 is an arc surface 30 or an inclined surface. The elasticity restoring component of the engaging piece 22 adopts a spring 28. A tail part of the sliding groove is disposed with a mounting hole 29 for axially mounting the spring 28. The front end of the spring 28 is abutted onto a tail end of the engaging piece 22. In the locked state, a front end of the engaging piece 22 laterally penetrates into an end part of the casing 11.

Figure 10:
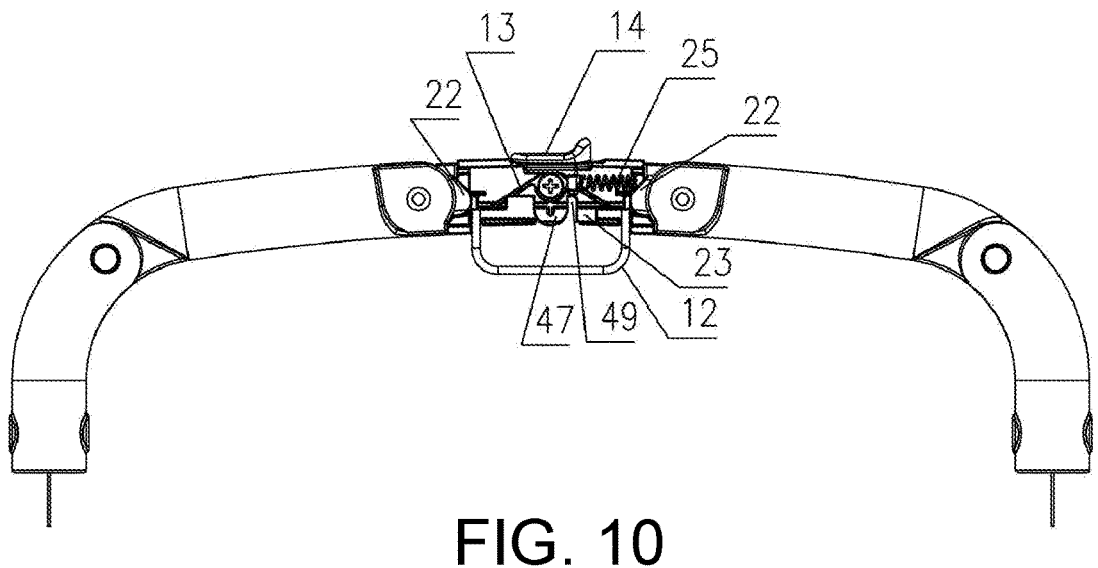
FIG. 10 is a top view of the three-fold handle in a locked state (with the upper housing of the intermediate component removed, and a press block in a limited state) according to the disclosure.
Figure 11:
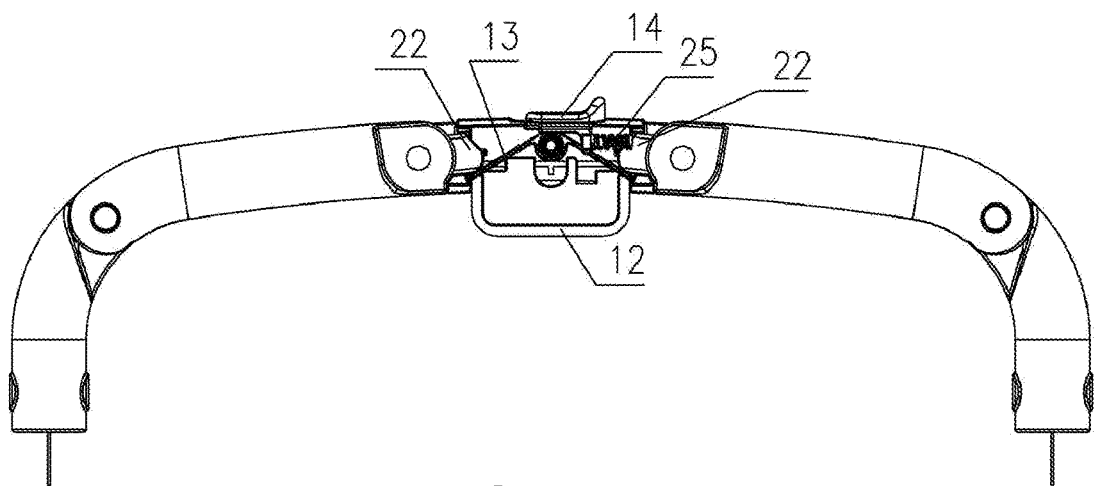
FIG. 11 is a top view of the three-fold handle in a locked state (with the upper housing of the intermediate component removed, and a press block released from limitation) according to the disclosure.
Figure 12:
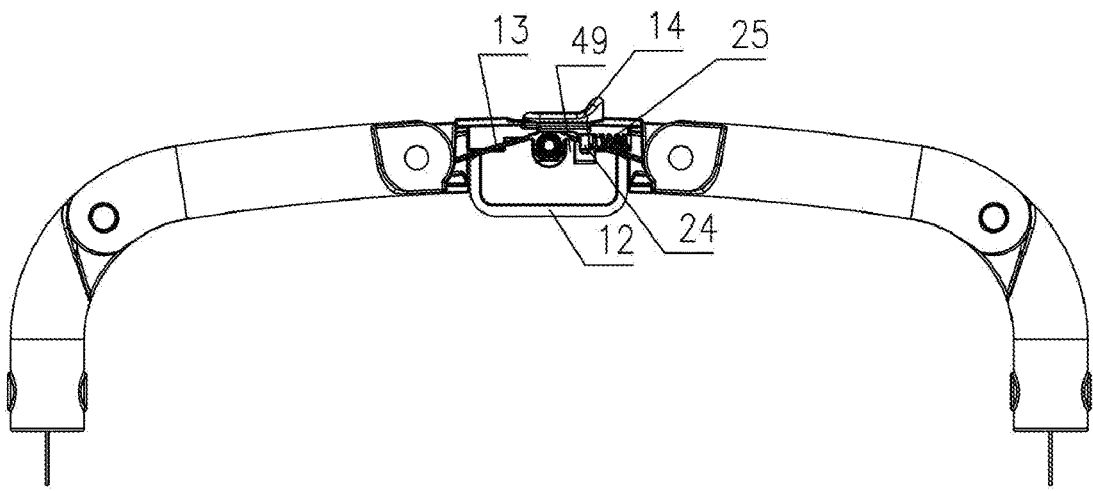
FIG. 12 is a top view of the three-fold handle (with the upper housing of the intermediate component removed, an unlocking piece elastically deformed, and an engaging piece pushed out of a casing of the intermediate component) according to the disclosure.
Figure 13:
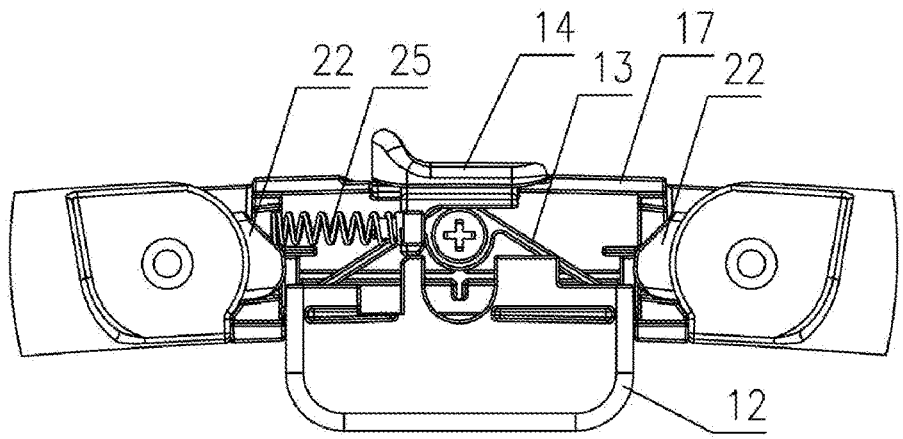
FIG. 13 is a bottom view of the three-fold handle (with a lower housing of the intermediate component removed, and a press block in a limited state) according to the disclosure.
Figure 14:
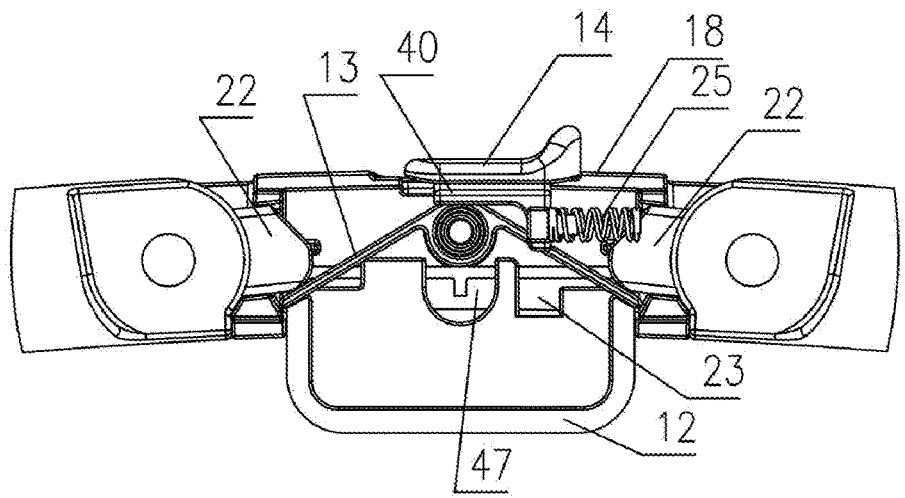
FIG. 14 is a top view of the intermediate component and a part of connecting components of the three-fold handle (with the upper housing of the intermediate component removed, and a press block released from limitation) according to the disclosure.
Figure 15:
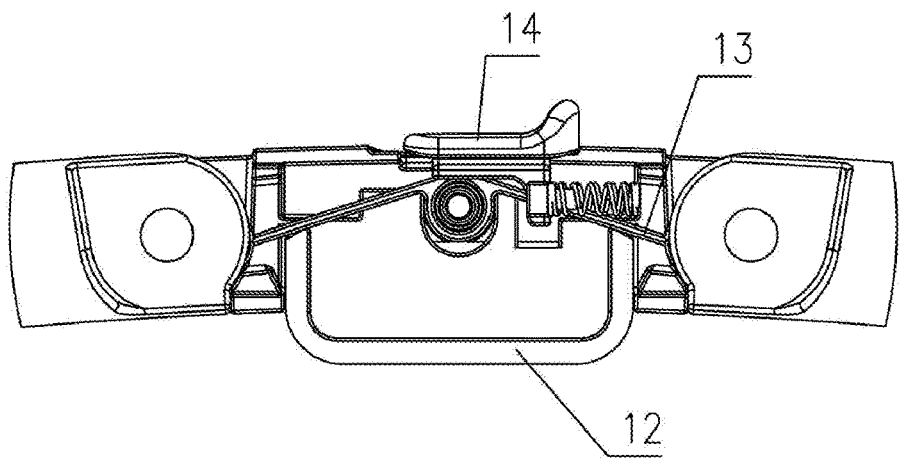
FIG. 15 is a top view of the intermediate component and a part of connecting components of the three-fold handle (with the upper housing of the intermediate component removed, the unlocking piece elastically deformed, and the engaging piece pushed out of a casing of the intermediate component) according to the disclosure.
Figure 16:
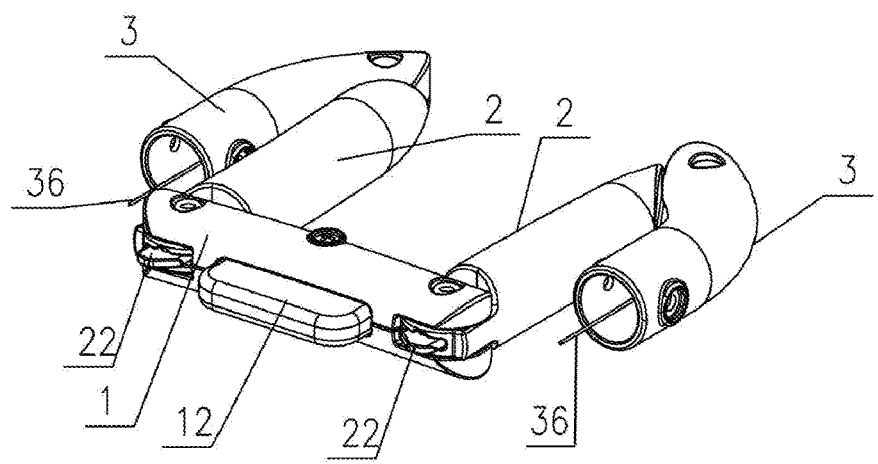
FIG. 16 is a schematic view of a three-dimensional structure of the three-fold handle in a folded state according to the disclosure.
Figure 17:
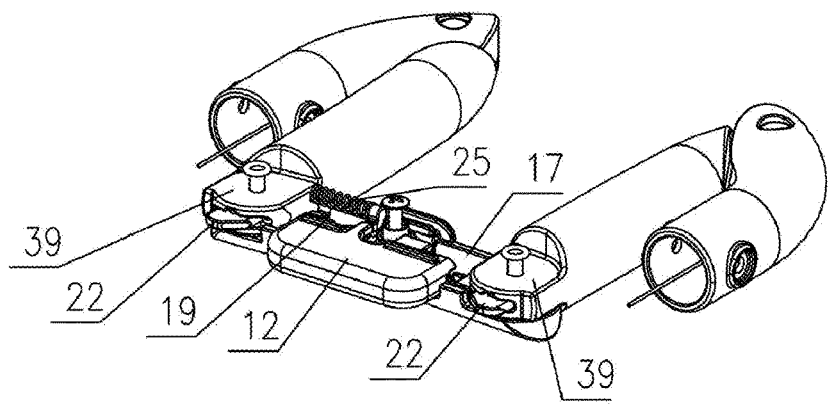
FIG. 17 is a schematic view of a three-dimensional structure of the three-fold handle in the folded state (with the lower housing of the intermediate component removed) according to the disclosure.
Figure 18:
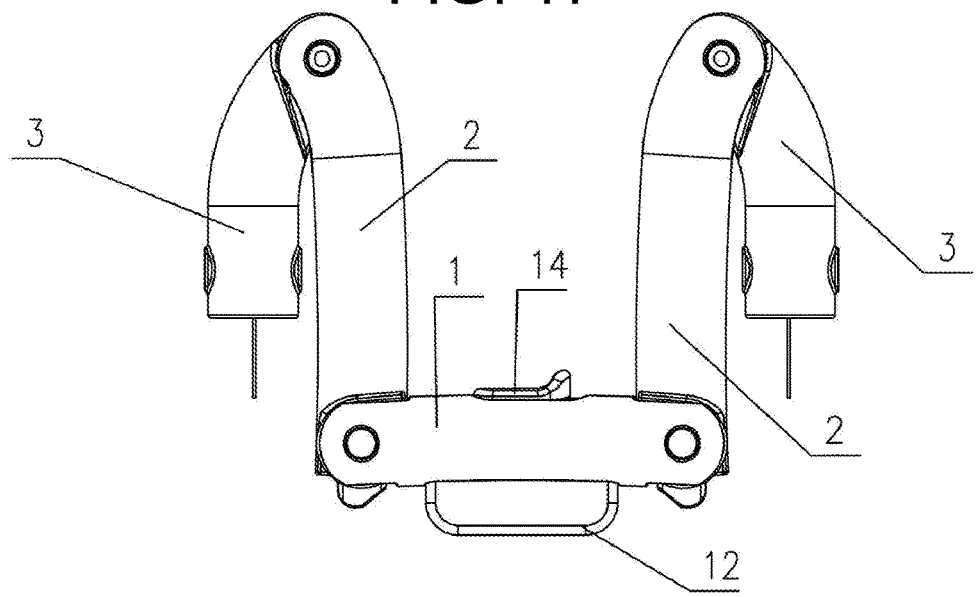
FIG. 18 is a top view of the three-fold handle in the folded state according to the disclosure.
Figure 19:
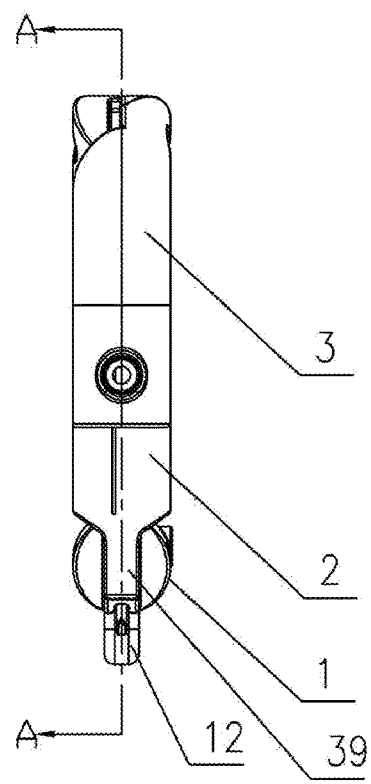
FIG. 19 is a side view of the three-fold handle in the folded state according to the disclosure.
Figure 20:
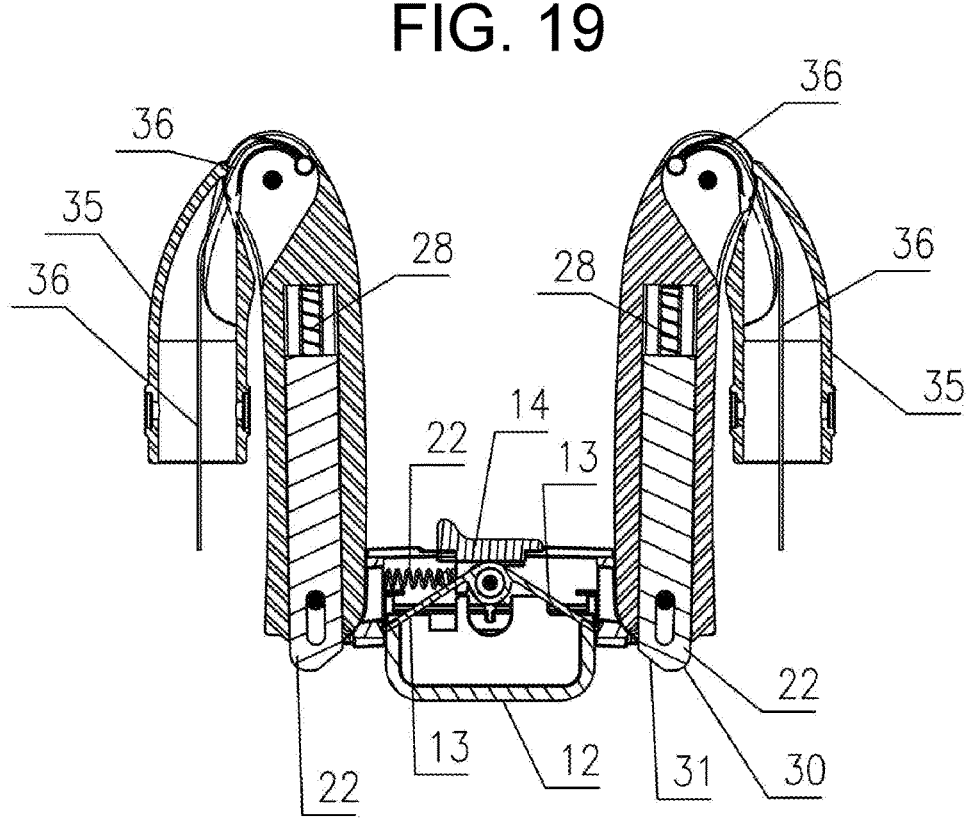
FIG. 20 is a cross-sectional view along line A-A in FIG. 19.

In the locked state, the protruding post 24 is abutted against the post 49 to limit the press block 12, see FIG. 10 and FIG. 13. The button 14 is toggled to disengage the protruding post 24 from the post 49, so as to release the limiting action on the press block 12, see FIG. 11 and FIG. 14. Simultaneously, the press block 12 is pushed backward. The fixing part of the unlocking piece 13 is located in the groove 47 of the press block 12, and the protruding post 24 is located in the groove 23. The two wings of the unlocking piece 13 are pushed by the press block 12 to elastically deform the unlocking piece 13. In the process, the two wings of the unlocking piece 13 slide along the inclined surface 46, the included angle between the two wings increase, and the projection of the unlocking piece 13 on the horizontal plane gradually increases to directly press against the arc surface 30 of the engaging piece 22. At this time, the force exerted by the unlocking piece 13 on the engaging piece 22 forms a lateral force component via the arc surface to push the engaging piece 22 out of the casing 11 to perform unlocking, see FIG. 12 and FIG. 15. The button is adopted to limit the press block, which can prevent the user from wrongly operating the press block causing the stroller to be retracted and affecting safety. The engaging piece 22 restores the original state under the elasticity restoring force of the spring 28. After the external force is released, the press block 12 restores the original state under the elasticity restoring force of the unlocking piece 13, and the button 14 restores the original state under the elasticity restoring force of the spring 25, and the intermediate component 1 is then pushed forward to fold the handle, see FIG. 16 to FIG. 20. Through pulling back the intermediate component 1, the engaging piece 22 is pushed into the casing 11 under the action of the elasticity restoring force of the spring 28 when the handle is unfolded to lock again.

The rear part of the engaging piece 22 is an inclined surface 31. The inclined surface 31 is configured so that the engaging piece 22 may flexibly slide when the stroller is retracted, so as to be easily disengaged from the casing 11 of the intermediate component 1. The hinge part of the intermediate component 1 and the connecting component 2 has a hinge shaft 32. The front part of the engaging piece 22 is disposed with an elongated hole 33. The hinge shaft 32 is mounted in the elongated hole 33 to hinge the end part of the casing 11 of the intermediate component 1 and the end part of the housing 21 of the connecting component 2 together. The hinge shaft 32 may relatively slide in the elongated hole as the engaging piece 22 moves.

The lower surface of the end part of the upper housing 17 of the intermediate component 1 is a platform. The upper surface of the end part of the lower housing 18 of the intermediate component 1 is a platform. A gap is formed between the two platforms. The front end of the connecting component 2 is a flattened block body 39 inserted into the gap and fixed by the hinge shaft 32.

A three-fold handle 48 employing the handle folding mechanism includes the intermediate component 1, the connecting components 2, and a pair of fixing components 3. The front ends of the pair of fixing components 3 are respectively hinged with tail ends of the connecting component 2. The fixing component 3 is mainly composed of a tube body 35 and a retracting steel rope 36. The retracting steel rope 36 passes forward through the tube body 35 and extends into a tail end of the housing 21 of the connecting component 2 along the outer side of the front end of the tube body 35 to be fixed on the outer side of the housing, so that after unlocking between the intermediate component 1 and the connecting component 2, the intermediate component 1 is pushed forward. The connecting component 2 drives the retracting steel rope 36 to rotate around the hinge part of the connecting component 2 and the fixing component 3, so that an effective distance of the retracting steel rope 36 becomes smaller to drive an engaging structure of a stroller frame (the engaging structure of the stroller frame is the prior art) to unlock, and that unlocking between the connecting components 2 and the fixing components 3 is realized. The three-fold of the handle is implemented while retracting the stroller.

The tail end of the connecting component 2 is a curve bending forward, and the lower surface thereof has a lower notch 41. A top surface of the lower notch 41 is a planar surface. The front end of the fixing component 3 is a curve bending forward, and the upper surface thereof has an upper notch 42. A bottom surface of the upper notch 42 is a planar surface. The planar surface of the upper notch 42 and the planar surface of the lower notch 41 are attached and fixed by a hinge shaft 43. When the intermediate component 1 and the connecting components 2 are locked, the tail end of the connecting components 2 and the front end of the fixing components 3 are in an arc transition. The lower notch 41 of the connecting components 2 and the upper notch 42 of the fixing components 3 cooperate to form a rotation space for the bending between the two after unlocking.

A stroller having a three-fold handle 48 includes a stroller frame, a seat and wheels that are mounted onto the stroller frame. The stroller frame includes a frame body, the engaging structure for retraction disposed on the frame body, and a three-fold handle. The tail end of the fixing component of the three-fold handle 48 is connected to the frame body. The tail end of the retracting steel rope 36 penetrates into the frame body to be connected to the engaging structure of the stroller frame.

What is claimed is:
1. A handle folding mechanism, comprising:
an intermediate component and a pair of connecting components respectively hinged at two ends of the intermediate component, wherein the intermediate component is mainly composed of a tubular casing, a press block, and an unlocking piece, a rear part of the press block extends into the casing through a front wall surface of the casing and is movably mounted to the casing so that the press block is movable back and forth, each of the connecting components is mainly composed of a tubular housing and an engaging piece having an elasticity restoring component, the engaging piece is slidably mounted in the housing in an axial direction, in a locked state, a front end of the engaging piece laterally penetrates into an end part of the casing, the unlocking piece has a fixing part fixed in the casing, the fixing part is disposed with a free end extending between a rear end of the press block and the front end of the engaging piece to push the press block backward, the free end of the unlocking piece is pushed by the press block so that the unlocking piece is elastically deformed, a projection of the unlocking piece on a horizontal plane is gradually increased so that the engaging piece is pushed out of the casing in a lateral direction to realize unlocking, before and after releasing an external force, the engaging piece and the press block are respectively restored to original shapes under an action of an elasticity restoring force, and the intermediate component is then pushed forward to fold a handle, through pulling back the intermediate component, the engaging piece is pushed into the casing to realize locking under the action of the elasticity restoring force when the handle is unfolded.

2. The handle folding mechanism according to claim 1, wherein the intermediate component further comprises a button having the elasticity restoring component, the button is laterally toggleable and is mounted on a rear wall surface of the casing, a limiting mechanism is provided between the button and the press block, and is co-movable with the button to move the press block or to release a limiting action, the button is toggled to release the limiting action of the limiting mechanism on the press block, and simultaneously pushes the press block backward, so as to perform unlocking; or in the locked state, the button is toggled to limit the press block through the limiting mechanism to prevent wrongly operation of the press block.

3. The handle folding mechanism according to claim 2, wherein a front part of a front end surface of the engaging piece is an arc surface or an inclined surface, and a rear part thereof is an inclined surface.

4. The handle folding mechanism according to claim 3, wherein the housing of each of the connecting components is formed with a sliding groove for mounting the engaging piece, an end of the elasticity restoring component of the engaging piece is fixed to a tail part of the sliding groove, and the other end of the elasticity restoring component is abutted onto a tail end of the engaging piece; a hinge part of the intermediate component and each of the connecting components has a hinge shaft, and a front part of the engaging piece is disposed with an elongated hole, the hinge shaft is mounted in the elongated hole to hinge the end part of the casing of the intermediate component and an end part of the housing of each of the connecting components together, and the hinge shaft is co-movable with the engaging piece to relatively slide in the elongated hole.

5. The handle folding mechanism according to claim 4, wherein the unlocking piece is ∧-shaped, a middle part of the unlocking piece is a fixing part, the press block is a hollow housing having an opening on a rear end surface thereof, a post extending backward is disposed on an upper rim and/or a lower rim of the opening, the button is mainly composed of a toggle part located outside the casing and a protruding post extending forward in the casing, and the protruding post is movable with the button to abut onto the post to limit the press block or to disengage from the post to release the limiting mechanism; two rims on two opposite sides of the opening in the lateral direction are respectively inclined surfaces, surfaces of two wings of the unlocking piece respectively match the inclined surfaces, during a process of elastic deformation of the unlocking piece, the two wings slide along the inclined surfaces.

6. The handle folding mechanism according to claim 5, wherein a front end surface of the toggle part of the button is a block body located in the casing of the intermediate component, the protruding post is disposed on the front end surface of the toggle part, and the elasticity restoring component of the button is located between the front end surface of the toggle part and an inner end surface of the casing.

7. The handle folding mechanism according to claim 6, wherein the casing of the intermediate component is mainly formed by an upper housing and a lower housing joining to each other, an upper surface and a lower surface of the rear part of the press block are respectively disposed with upper and lower corresponding lateral limiting protruding strips, an inner top surface of the upper housing and an inner bottom surface of the lower housing are respectively disposed with lateral limiting slots for restraining the limiting protruding strips, the limiting protruding strips is movable back and forth in the limiting slots to implement movable mounting of the press block.

8. A three-fold handle employing the handle folding mechanism according to claim 1, the three-fold handle comprising the intermediate component, the connecting components, and a pair of fixing components, front ends of the pair of fixing components are respectively hinged with tail ends of the connecting components, each of the fixing components is mainly composed of a tube body and a retracting steel rope, the retracting steel rope extends forward through the tube body into a tail end of the housing of each of the connecting components, so that after unlocking between the intermediate component and the connecting components, the intermediate component is pushed forward, the connecting components drive the retracting steel ropes to rotate around hinge part of the connecting components and the fixing components, so that an effective distance of the retracting steel ropes becomes smaller to drive an engaging structure of a stroller frame to unlock, and that unlocking between the connecting components and the fixing components is realized, and three-fold of the handle is realized while retracting.

9. The three-fold handle according to claim 8, wherein the casing of the intermediate component is mainly formed by the upper housing and the lower housing joining to each other, an upper surface and a lower surface of the rear part of the press block are respectively disposed with upper and lower corresponding lateral limiting protruding strips, an inner top surface of the upper housing and an inner bottom surface of the lower housing are respectively disposed with the lateral limiting slots for restraining the limiting protruding strips, the limiting protruding strips is movable back and forth in the limiting slots to implement movable mounting of the press block, a lower surface of an end part of the upper housing of the intermediate component is a platform, an upper surface of an end part of the lower housing of the intermediate component is a platform, a gap is formed between the two platforms, a front end of the connecting components is a flattened block body inserted into the gap and fixed by a hinge shaft; the tail end of the connecting components and the front end of the fixing components are respectively curves bending forward, the tail end of the connecting components and the front end of the fixing components respectively have notches matching each other, and the notches respectively have planes attached to each other and are fixed through the hinge shaft, when the intermediate component and the connecting components are locked, the tail end of the connecting components and the front end of the fixing components are in an arc transition, the notches of the connecting components and the fixing components cooperate to form a rotation space for bending between the two after unlocking.

10. A stroller having the three-fold handle according to claim 8, the stroller comprising: a stroller frame, a seat and wheels that are mounted on the stroller frame, wherein the stroller frame comprises a frame body, the engaging structure for retraction and the tree-fold handle that are disposed on the frame body, a tail end of the fixing components of the tree-fold handle is connected to the frame body, and a tail end of the retracting steel ropes penetrates into the frame body to be connected to the engaging structure of the stroller frame.

\* \* \* \* \*